US007603935B2

(12) United States Patent
Howe

(10) Patent No.: US 7,603,935 B2
(45) Date of Patent: Oct. 20, 2009

(54) WORKPIECE SUPPORT DEVICE FOR POWER SAWS

(76) Inventor: John F. Howe, 372 3rd Range Rd., Pembroke, NH (US) 03275

( * ) Notice: Subject to any disclaimer, the term of this patent is extended or adjusted under 35 U.S.C. 154(b) by 227 days.

(21) Appl. No.: 11/589,610

(22) Filed: Oct. 30, 2006

(65) Prior Publication Data

US 2008/0098867 A1 May 1, 2008

(51) Int. Cl.
*B26D 7/02* (2006.01)
*B23Q 3/00* (2006.01)

(52) U.S. Cl. ....................... 83/452; 83/467.1; 83/468.7; 83/468.2; 269/304

(58) Field of Classification Search ................... 83/452, 83/467.1, 468.7, 468.2; 269/303, 304, 315
See application file for complete search history.

(56) References Cited

U.S. PATENT DOCUMENTS

| | | | | |
|---|---|---|---|---|
| 2,485,274 | A | 10/1949 | Garrett | |
| 2,492,686 | A * | 12/1949 | Cummins | 269/315 |
| 2,747,625 | A | 5/1956 | Small | |
| 2,838,078 | A * | 6/1958 | Cusanza | 83/468 |
| 4,111,088 | A | 9/1978 | Ziegelmeyer | |
| 4,256,000 | A | 3/1981 | Seidel | |
| 4,335,512 | A * | 6/1982 | Sheps et al. | 30/376 |
| 4,412,468 | A | 11/1983 | Bucy | |
| 4,691,607 | A | 9/1987 | Webb | |
| 4,751,865 | A * | 6/1988 | Buckalew | 83/745 |
| 4,972,749 | A | 11/1990 | Grove | |
| 5,105,862 | A | 4/1992 | Skinner et al. | |
| 5,245,903 | A | 9/1993 | Armentrout | |
| 5,443,554 | A | 8/1995 | Robert | |
| 5,526,856 | A | 6/1996 | Pedri | |
| 5,592,981 | A | 1/1997 | Derecktor | |
| 5,836,365 | A | 11/1998 | Derecktor | |
| 5,845,555 | A | 12/1998 | Dawley | |
| 6,240,822 | B1 | 6/2001 | Musser | |
| 6,644,157 | B2 | 11/2003 | Huang | |
| 6,745,804 | B2 | 6/2004 | Welsh et al. | |
| 2004/0144222 | A1 | 7/2004 | Wayne | |

* cited by examiner

*Primary Examiner*—Ghassem Alie
*Assistant Examiner*—Bharat C Patel
(74) *Attorney, Agent, or Firm*—Daniels Patent Law PLLC; Scott A. Daniels

(57) ABSTRACT

A workpiece support attachment for power saws and similar materials cutting devices including a workpiece support having a measuring guide having movable stops capable of abutting a workpiece and maintaining a workpiece, or a number of workpieces, in a desired position for cutting with the power saw.

8 Claims, 6 Drawing Sheets

WORKPIECE SUPPORT DEVICE FOR POWER SAWS

FIELD OF THE INVENTION

The present invention relates to a workpiece support attachment for power saws and similar materials cutting devices. More particularly, the present invention relates to a workpiece support having a measuring guide having movable stops capable of abutting a workpiece and maintaining a workpiece, or a number of workpieces, in a desired position for cutting with the power saw.

BACKGROUND OF THE INVENTION

Cutting a workpiece such as building materials like lumber, metal, pvc stock and siding etc., with a power saw typically requires the initial step of positioning the workpiece in a desired configuration with respect to the saw to obtain a desired length of the workpiece. A positioning means is especially important when cutting a workpiece to a specific length or width especially where numerous work pieces must be cut to the same length an accurate stable positioning means can allow the operator to efficiently cut numerous workpieces to the same length. When using a power saw it is inaccurate and inefficient to measure the length of each workpiece and then mark the length with a pencil. Also, if several cuts are going to be made at the same length, it is inefficient to measure, mark and re-measure every time you make a cut. It is common to use workbenches with cutting and measuring guides that aid in making accurate cuts. To this end, several different types of guide means have been created which arrange a workpiece in such a desired configuration for cutting by a power saw.

As an example of prior art, a complex lumber measurement device is shown is shown in U.S. Pat. No. 2,747,625 to Small. This device functions well to measure a particular cutoff length, but is expensive and designed more for wood shops or high volume commercial shops and would not be affordable to a typical owner of a power saw.

A number of prior art devices utilize the concept of a slide which is lockable to a fence of the radial arm saw (that is, the upright along which a board is positioned prior to cutting). Such devices are shown in U.S. Pat. No. 4,256,000 to Siedel and U.S. Pat. No. 4,111,088 to Ziegelmeyer. While such device often function adequately, they must be removed from the rail in order to allow the saw to be placed in a mode where boards of varying lengths can be easily cut.

One prior art device has been able to partially overcome the problem of quickly moving the positioner out of the way and is shown in the U.S. Pat. No. 4,412,468 to Bucy. In Bucy, a fixed slide guide is position along the back of the fence with a slide that can be rotated to extend forward of the fence. The fence is channeled to allow the guide to fall into a selected channel. While the slide in the Bucy '468 device can be moved to various locations and can be moved out of the path of boards to be cut when different lengths are desired, the fixed spacing between channels prevents easy position of the slide in an infinitely large variety of positions and prevents simple sliding of the slide in a down position to a new location.

U.S. Pat. No. 4,972,949 to Grove discloses a radial arm saw including a calibrated fence having a plurality of stop gauge members that are slidably mounted in fence units. The design of Grove '949 does not allow for small increments of stop distance and therefore is limited in its precision. Also, the stop gauge members are spring-loaded and therefore are prone to wear and failure.

The above references provide significant difficulty and inefficiency when sawing a plurality of boards, panels and the like at one time. The stop member has to be unscrewed, positioned anew and re-tightened for each cutting sample. Employing the existing technology, therefore increases the accuracy and efficiency of standard table saw cutting relative to the previous technology.

OBJECTS AND SUMMARY OF THE INVENTION

One object of the present invention is to overcome the above-mentioned shortcomings of the prior art with an efficient and accurate workpiece positioner for attachment to a power saw.

Another object of the present invention is to provide a workpiece support and a measuring guide slidably situated thereon which is capable of abutting a workpiece on a power saw or chop saw to provide accurate cutting of the workpiece.

A further object of the present invention is to provide a an intermediate guide stop to abut the measuring guide and allow for simple adjustment of the measuring guide relative to the power saw in order to accommodate different sized workpieces. Still another object of the present invention is to provide a plurality of guide stops along separate rails on the workpiece support so as to allow the measuring guide to be capable of small incremental measurements in order to provide precise cuts to the supported workpiece.

In order to attain the above objects, one aspect of the present invention provides a powersaw attachment apparatus comprising a unshaped base having first and second walls extending from a bottom, an inner track disposed between the first and second walls of the base, a measuring guide capable of sliding on the base and over the inner track and containing a wall extending perpendicular to the bottom of the outer track, and a stop capable of attaching to the inner track.

BRIEF DESCRIPTION OF THE DRAWING

By way of example, the invention will now be described with reference to the accompanying drawings in which.

DETAILED DESCRIPTION OF PREFERRED EMBODIMENT

Figure 1:
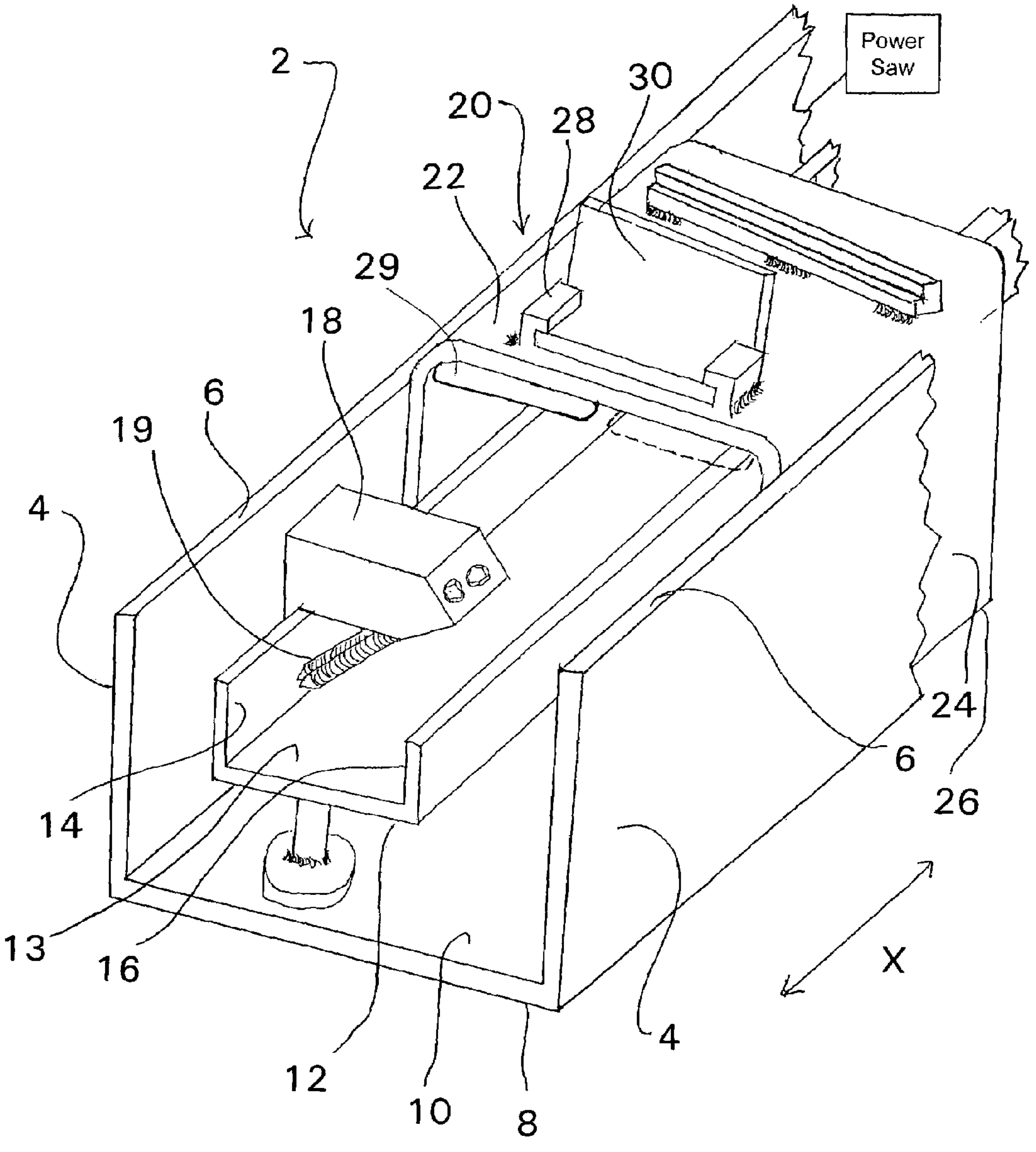
FIG. 1 is a perspective view of one embodiment of an a workpiece support attachment with a measuring guide attachment.

Referring to FIG. 1, an assembled workpiece support attachment 2 for a power saw is disclosed. The attachment 2 is generally supported on legs or sawhorses (not shown) immediately adjacent the power saw and the attachment 2 acts as both a support for the workpiece to be cut, and includes an adjustable measuring guide attachment 20 used to adjustably maintain the workpiece in the appropriate and desired position for cutting.

The workpiece support attachment 2 is formed by a u-shaped beam 8 having opposing outer walls 4 contiguous with and extending upwards from a bottom wall 10 to an upper edge 6 at a desired height from the bottom wall 10. The U-shaped beam 8 can be of any length but generally extends between about 4 and 25 feet long, more preferably between about 8 and 12 feet long to accommodate conventionally sized lumber. Supported on the bottom wall 10 and positioned between the outer walls 4 of the u-shaped beam 8 is an inner track 12 also formed in a U-shape configuration similar to that of the beam 8. The U-shaped inner track 12 is defined by a first clamping wall 14 and a second clamping wall 16 extending upwards from a track base 13. In general, the first and second clamping walls 14, 16 extend upwards and parallel with the corresponding opposing outer walls of the beam 8, but extend to a height less than that of the outer walls 4 for the reasons as described in further detail below.

The U-shaped configuration is important because efficient and economical fabrication of the present attachment 2 is important. The U-shaped beam 8 and inner track 12 are easy to manufacture or obtain aluminum, steel or other alloy stock. And thus, other than cutting such stock to length, little to no further fabrication for these parts is necessary.

A guide stop 18 is provided for clamping attachment to at least one of the first and second clamping walls 14, 16 of the inner track 12. The guide stop 18 can attach upon either clamping wall 14, 16 by means of a pair of angled set screws 19 for directly engaging the inner side of the first or second clamping wall 14, 16. The guide stop 18 can be set at any location or position along the length of the inner track 12 and is sized large enough to interfere with, i.e., prevent the continued sliding of the measuring guide attachment 20 discussed below.

Figure 2:
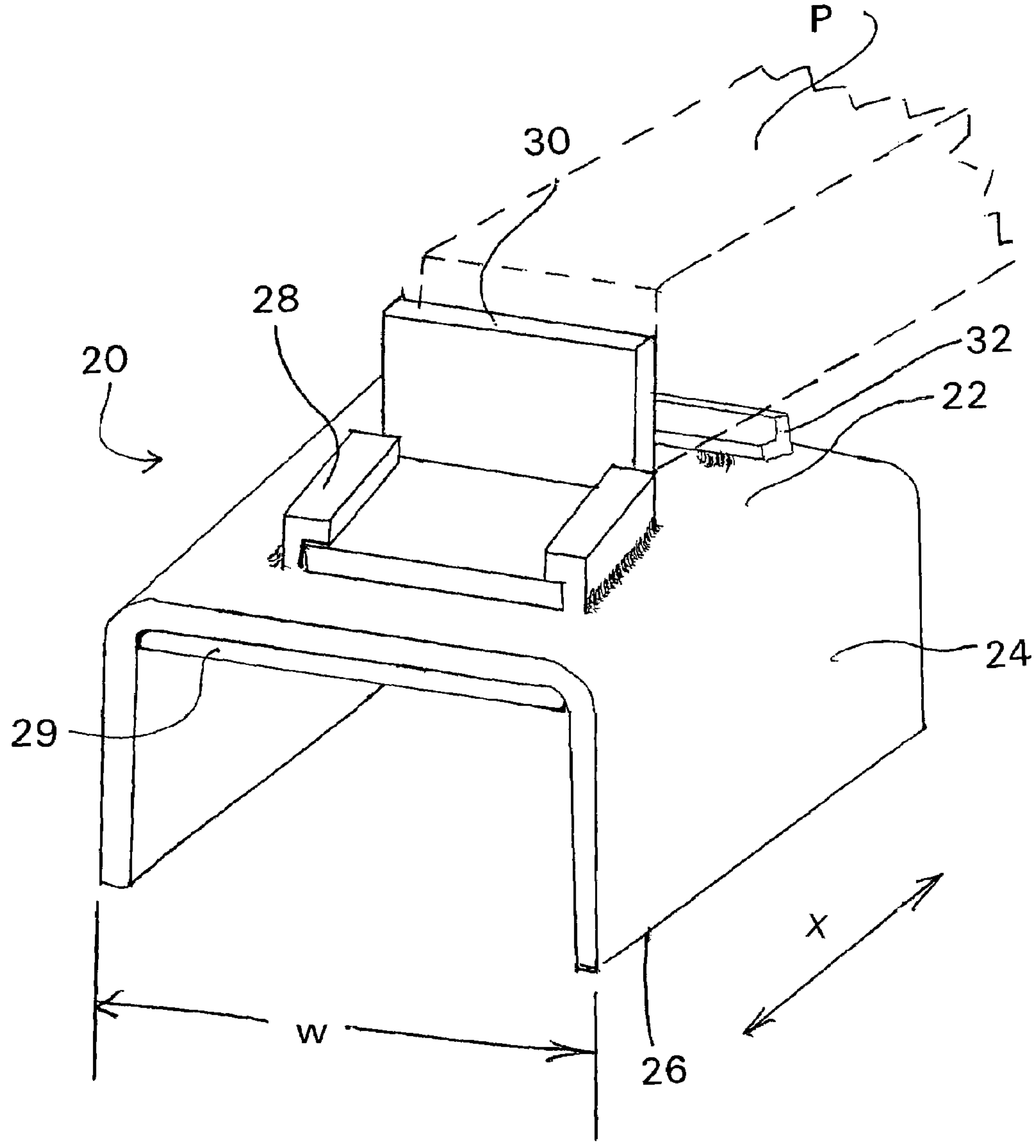
FIG. 2 illustrates a perspective view of one embodiment of the measuring guide attachment carrying a workpiece stop.

The measuring guide attachment 20 as best seen in FIG. 2 is also a substantially U-shaped apparatus which, when properly mounted in conjunction with the beam 8 is mounted in an upside down u-shaped configuration and nested between the outer walls 4 of the beam 8. Observing the measuring guide attachment 20 in the upside down U-shaped configuration in FIG. 1, a top surface 22 is connected to two opposing downwardly depending support sides 24. The support sides 24 are spaced just wide enough to define a width w of the guide attachment 20 which fits slidably within the outer walls 4 of the beam 8. The support sides 24 also extend downward to respective opposing bottom edges 26 which are directly supported by the bottom wall 10 of the beam 8. The supports sides have a height leaving sufficient clearance underneath the top surface of the measuring guide attachment 20 for passage of slidable guide attachment 20 over the inner track 12. With the measuring guide 20 thus supported over the inner track 12 and slidably positioned on the beam 8, the measuring guide attachment 20 is thus slidable along the length of the beam 8.

Observing FIG. 2 a more detailed discussion of the measuring guide attachment 20 is provided. Supported on the top surface 22 of the measuring guide attachment 20 is a slot 28 or pair of slots for receiving a stop wall 30. The stop wall 30 is the specific workpiece abutting structure which prevents the movement of a workpiece P in the longitudinal direction X along the length of the beam 8. The slot 28 can either be welded onto the measuring guide attachment 20 or fastened by any other suitable mechanism to secure the slot 28 into position. The stop wall 30 can also be welded or fixed in a manner known to those of skill in the art, onto the measuring guide attachment 20, but is shown in FIG. 2 to removably slide into the slot 28 to create a more compact, detachable and portable device. The stop wall 30 should be vertically high enough to substantially fully engage with the workpiece P and thus prevent the movement of the workpiece P during cutting operations.

A support spacer 32 can further be provided on the top surface 22 of the guide attachment 20 spaced from the stop wall 30 and forward in the longitudinal X direction towards the power saw. The support spacer 32 is for supporting an end of the workpiece P opposite from the end of the workpiece to be cut when the stop wall 30 is removed. The spacer 32, like the slot 24, can be welded onto the surface of the measuring guide attachment 20 at any point or can also be attached to the measuring guide attachment 20 with a height and/or width adjustment means that will allow sufficient adjustment of the spacer 32 to accommodate different sized or shaped workpieces.

The measuring guide attachment 20 may also be provided with a downwardly depending lip or edge 29 on an inside surface of the measuring guide attachment 20. This lip or edge 29 may be located at a front end, or a back end, or anywhere along the length of the measuring guide attachment 20 on the underside inside surface thereof for directly engaging a guide stop 18. The edge 29 may be integrally formed with the measuring guide attachment 20 or it may be welded on as a separate feature. The edge 29 may extend from one side of the measuring guide attachment 20 to the other side, or may only partially extend across this width w. The edge 29 may even be fastened on in a widthwise moveable or sliding manner so as to be slidable to different points across the width of the measuring guide attachment 20. The lip or edge 29 is important because the depending support sides 24 of the measuring guide attachment 20 raise the underside surface of the measuring guide attachment 20 above the maximum height of the guide stops 18. This is so the measuring guide attachment 20 can be placed over unengaged guide stops 18 positioned near a desired engaged guide stop 18. In any event, the depending lip or edge 29 is used to directly contact and engage the desired guide stop whereas other guide stops positioned nearby do not interfere with the measuring guide attachment 20.

Figure 3:
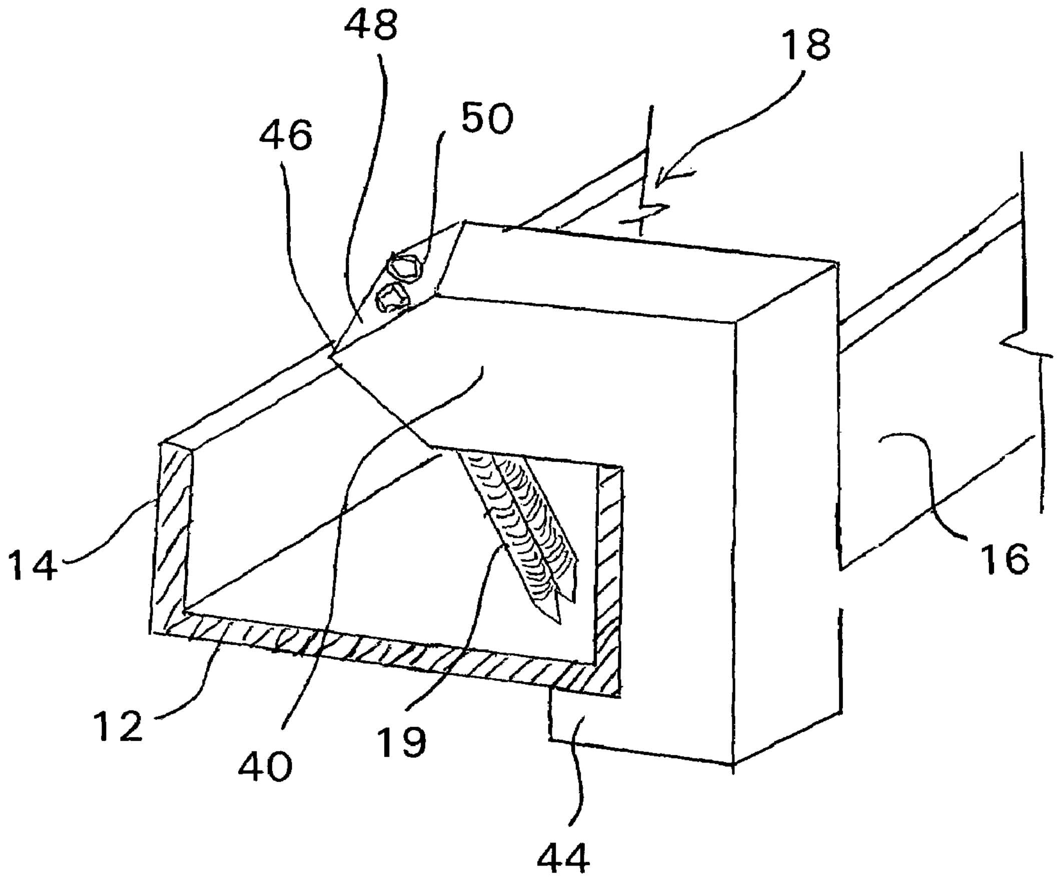
FIG. 3 illustrates a perspective view of a measuring guide stop of a preferred embodiment with set screws.

The preferred embodiment of the guide stop 18 is shown in FIG. 3. The guide stop 18 has an overall c-shape defined by an interconnected top portion 40, an intermediate portion 42 and a bottom portion 44. When in the mounted or engaged position on the inner track 12, the top portion extends horizontally over and at least partially across one of the first and second inner walls 14, 16. At a free end 46 of the top portion 40 is formed an angled face 48 having a pair of threaded through bores 50 formed therethrough for receiving the correspondingly threaded set screws. The top portion 40 is connected to the intermediate portion 42 which depends downwards and along the first or second clamping wall 14, 16 of the inner track 12. The bottom portion 44 extends horizontally, spaced from but in the same direction as the top portion 40 from a connection with the intermediate portion 42 to pass underneath the bottom wall of the inner track 12. This C-shaped configuration at least partially encompasses either the first or second clamping wall 14, 16 upon which the guide stop 18 is mounted.

In the mounted and secured position the angled set screws are angled so as to engage with the inner wall of the inner track and, when tightened, to thereby pull the C-shaped guide stop snugly against the outer wall of the inner track 12. In one embodiment of the invention the set screws depend at an angle which brings the ends of the set screws directly into engagement with the corner formed between the first or second clamping wall and the bottom wall of the track 12. When the set screws are loosened the c-shaped guide stop may remain engaged with, but slidable along the first or second clamping wall of the inner track 12. The slidable adjustment of the guide stop 18 along the track 12 is important as will be explained in further detail below, it is the guide stop 18 which controls the adjustment of the measuring guide attachment 20 so as to adjust the workpiece P settings of the apparatus. Thus, because the guide stop 18 can be adjustably slid along the inner track 12 to any particular position along the length of the inner track 12, the measuring guide attachment is provided with an almost infinite positioning adjustment along the entire length of the inner track.

Figure 4:
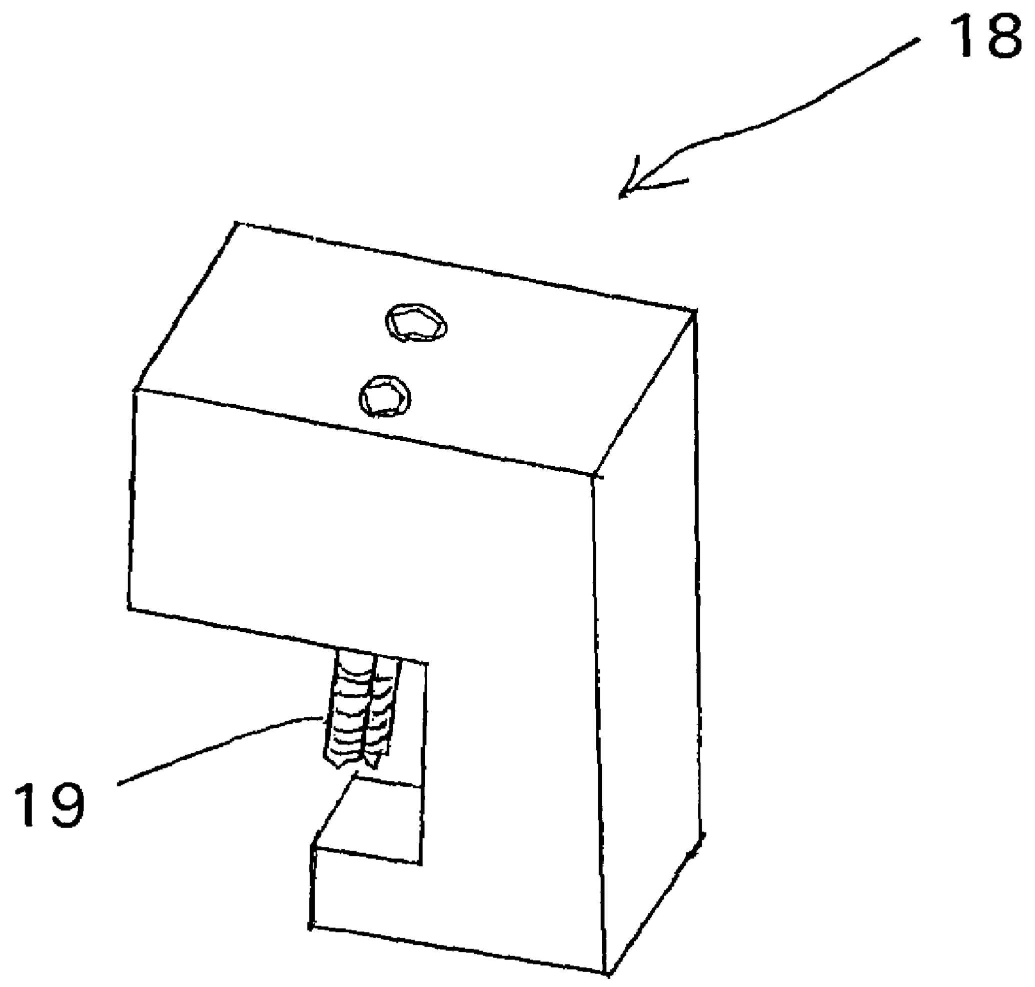
FIG. 4 illustrates a perspective view of an alternative embodiment of a measuring guide stop with set screws.
Figure 5:
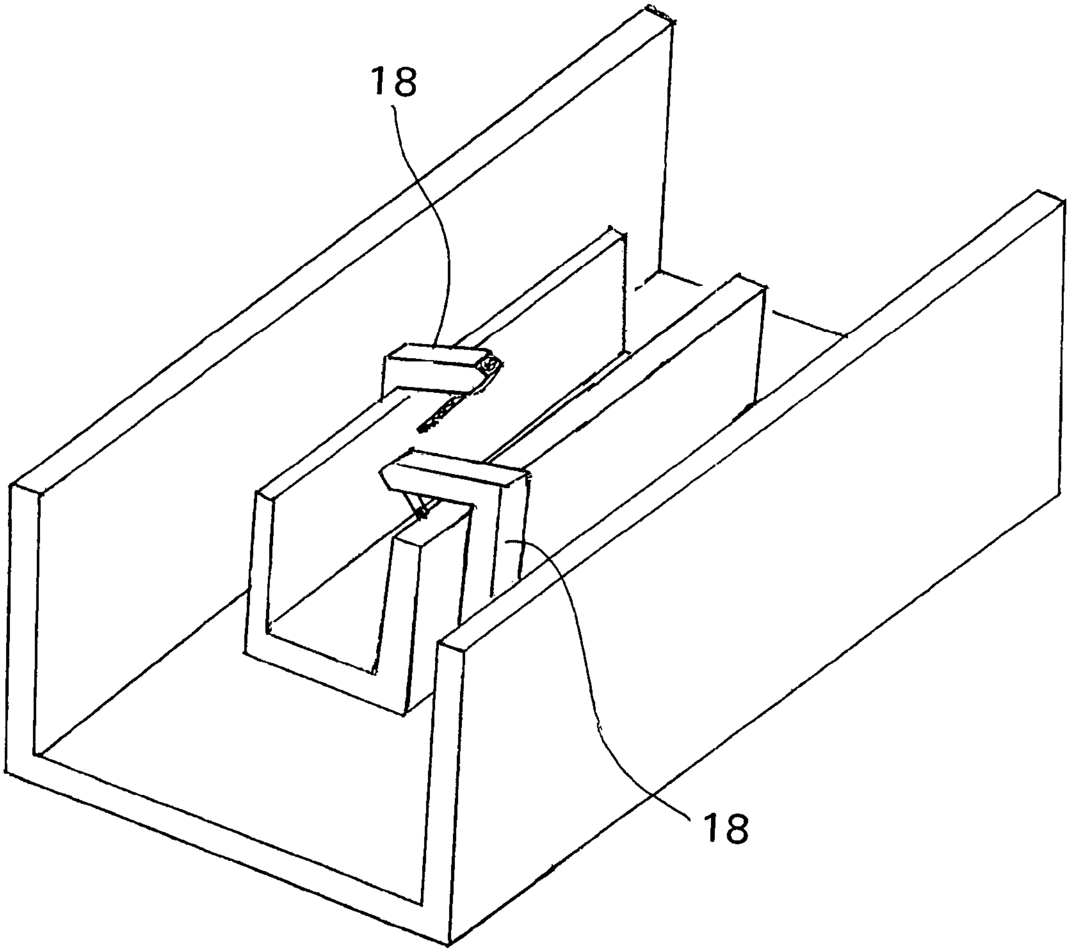
FIG. 5 illustrates a perspective view of an alternative embodiment for the measuring guide stop positioned on the inner track.

FIG. 4 illustrates a further embodiment of the guide stop 18 in which the top portion does not include angular faces formed therein. No matter what specific design of the guide stop 18 is utilized, the purpose of the guide stop 18 remains the same, that is to slide along the inner track 12 and be secured to a desired position along the inner track 12 so as to restrain the measuring guide attachment 20 from further sliding movement along the beam 8 in at least one direction. In other words, the guide stop 18 is an intermediate adjustment piece which a user may locate at any position along the inner track. In addition, as seen in FIG. 5, a plurality of such guide stops 18 may be utilized along the length of the inner track 12 and may be positioned on either the first or the second clamping wall of the inner track 12.

It can be appreciated that this clamping system provides the operator with almost any increment by which workpieces can be cut. The guide stops 18 positioned on one of the first and second clamping walls 14, 16 can be moved without interference from guide stops 18 on the opposite clamping wall. For example, along the longitudinal length of the inner track 12, the relatively small size of the guide stop 18 allows for a second guide stop 18 to be placed directly adjacent, i.e., touching or even spaced either ahead or behind the first stop 18 in the longitudinal direction on either the first clamping wall 14, or on the second clamping wall 16. An even tighter tolerance is obtained where the adjacent second guide stop 18 is positioned on the second clamping wall 16 opposite to the first clamping wall 14 with the first guide stop 18. With the first and second guide stop oppositely positioned on the inner track 12, they can actually overlap in the longitudinal direction of the track so as to be adjustable with respect to one another, without interfering with one another. A greater range of cutting can therefore be obtained without moving numerous guide stops and thus several guide stops 18 can be placed on the inner track 12, and even longitudinally overlap one another without disrupting one another. Multiple stop placements on either clamping wall 14, 16 can aid in the efficiency of cuts, as one stop 18 can be removed or moved immediately after a cut, and without reinsertion, a second stop 18 can inhibit motion in the longitudinal X direction for a differently sized workpiece. Alternatively, as seen in FIG. 1, the lip or edge 29 may be slidable or moveable to one side or the other along the underside of the measuring guide attachment 20 and therefore engage the respective guide stops 18 on one clamping wall or the other while permitting the measuring guide attachment 20 to pass over another opposite, overlapping guide stop 18. The embodiment in FIG. 5, therefore provides the user with different advantages for different cutting scenarios while still functioning in substantially the same manner as the preferred embodiment shown in FIG. 1 and FIG. 3.

As mentioned above, the inner track 12 can contain a first clamping wall 14 and a second clamping wall 16 for attachment of the stop 18. These clamping walls 14, 16 can be substantially thin relative to the stop 18 to save in material costs and ease the process of clamping the stop 18 to the inner track 12. The inner track 12 can be raised on pedestals, as shown in FIG. 1, to accommodate the lower portion 44 of the C-shaped guide stop 18 or rest flat against the bottom 10 of the outer track 4, as shown in FIG. 5, and with the guide stops 18 being formed as an L-shaped structure without the bottom portion 44 to accommodate the inner track 12 of this embodiment. Advantages to a raised inner track 12 include the availability of further surface area of the inner track 12 which the C-shaped guide stop can grip onto as shown in FIG. 3.

The inner track 12 is essentially centrally and parallel disposed between the outer walls 4 of the beam 8. The first and second clamping walls 14, 16 of the inner track 12 are, however, generally formed lower in height than the outer walls 4 to accommodate the measuring guide attachment 20. The sidewalls 24 of the measuring guide attachment 20 are generally formed with a slightly greater height than either the outer walls 4 of the beam 8 so as to extend the top surface 22 of the guide attachment higher than the first and second clamping walls 14, 16 of the inner track and thus provide clearance over the inner track 12, as well as the guide stops 18 for the top surface of the measuring guide attachment 20. When the guide stops 18 are set on the inner track 12 the top portion 40 of the guide stop 20 is generally lower in height than the underside of top surface 22 of the measuring guide attachment 20, so as to not interfere i.e., abut with the top surface 22. Thus, only the depending edge or lip 29 interacts with a desired guide stop 18 in order to set the desired cutting length for a workpiece and any other adjacent guide stops 18 do not interfere with the positioning of the measuring guide attachment 20.

Figure 6:
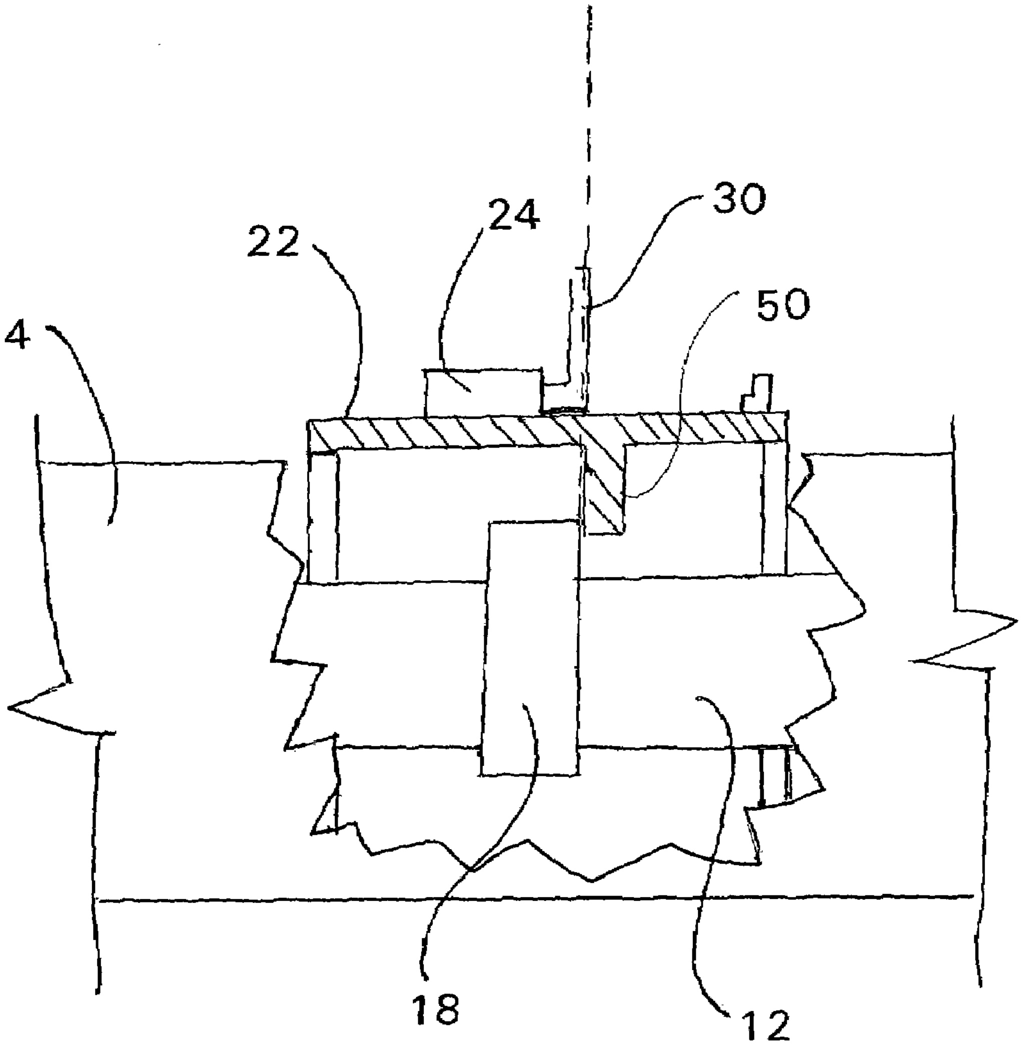
FIG. 6 is a side elevational view of the base and inner track showing alignment of the guide stop and workpiece stop.

In another embodiment of the present invention shown in FIG. 6, the lip or edge 29 is formed as a depending portion 50 on an underside of the top surface 22 of the measuring guide attachment 20 which contacts the guide stop 18. For example, a specific depending abutment portion 50 could comprise a depending portion located and aligned on the underside of the measuring guide attachment 20 and spaced from the rear end so that the depending portion 50 was directly transversely aligned with the workpiece abutting stop wall 30 on the top surface 22 of the measuring guide 20. As can be appreciated, where the underside of the top surface 22 of the measuring guide 20 is sized to pass over the guide stop 18, the depending portion 50 on the underside of the measuring guide 20 would depend therefrom to an extent so as to contact the guide stop 18 and the measuring guide would therefore be restrained from further linear movement in at least the longitudinal direction away from the power saw.

Importantly, this would align the stop wall 30 on top of the measuring guide 30 directly over the edge of the guide stop 18 on which the depending portion 50 is abutting and, therefore, the stop wall 30 would correspond almost exactly to the linear alignment of the guide stop 18 relative to the power saw. For example, in use an operator has only to move the guide stop 18, for instance to the 36" mark on the inner track 12, which indicates 36" from the blade of the power saw, and the measuring guide and corresponding stop wall 30 abutting the workpiece P would, therefore, also be aligned at 36" from the power saw blade to facilitate measuring and cutting.

The workpiece support attachment 2 can easily be operated by undergoing a few simple steps. First, the attachment 2 is set up, i.e., positioned on legs or sawhorses directly adjacent to a power saw. Secondly, the guide stop 18 which is generally slidably situated upon the inner track 12 is moved to a desired position for cutting a length of a workpiece. The bolts or screws of the guide stop 18 are securely fastened against either the first clamping wall 14 or the second clamping wall 16 and then the measuring guide attachment 20 can be slid or pushed along the beam 8 to abut against the guide stop 18 at a designated distance from the power saw. The stop wall 22 should be inserted or aligned into the slot 24 as previously described at a distance from the power saw corresponding to the desired length of the cut workpiece. A workpiece can then be positioned on the measuring guide attachment 20 and abut the stop wall 22 to ensure that no additional longitudinal movement away from the power saw is possible. The workpiece can be cut once it is positioned on and against the measuring guide attachment 20 for the appropriate length cut.

After an initial cut, a second workpiece can be placed on and against the measuring guide attachment 20 and the above process repeated or, in the alternative, the guide stop 18 can be loosened and moved and the measuring guide attachment 20 shifted longitudinally X to abut against the newly positioned guide stop 18. Otherwise, a second guide stop 18 could be positioned on the inner track and the measuring guide 20 could be wholly moved so as to abut against the second guide stop 18. The second guide stop 18 can be positioned either on the same clamping wall 14,16 as the first stop 18 or on the opposite clamping wall 14 16 for smaller increments of cutting lengths.

Having described several embodiments of the support in accordance with the present invention, it is believed that other modifications, variations, and changes will be suggested to those skilled in the art in view of the description set forth above. It is, therefore, to be understood that all such variations, modifications, and changes are believed to fall within the scope of the invention as defined in the appended claims.

What is claimed is:

1. A power saw attachment comprising:

a U-shaped base having an axial length and the base being defined by a first wall and a second wall extending upwards from a bottom wall along an axial length;

a U-shaped inner track axially and centrally disposed between said first wall and said second wall of said base;

a measuring guide attachment, said measuring guide attachment spaced from the U-shaped inner track and configured to be supported directly on the base and slidably received between the first and second walls of the base;

said measuring guide attachment supporting a stop wall extending perpendicular to said axial length bottom wall of said U-shaped base, and at least one guide stop separate from the measuring guide attachment, the at least one guide stop being configured to be adjustably coupled solely to said inner track and axially moveable independent of the measuring guide attachment along the length of the U-shaped inner track relative to the measuring guide attachment; and wherein the measuring guide attachment abuts axially against a face of the at least one guide stop to position the stop wall on the measuring guide attachment linearly aligned with the face of the at least one guide stop, and the measuring guide attachment defines a passage through which the inner track extends and an abutment edge for abutting on the at least one guide stop coupled to the inner track.

2. The power saw attachment as set forth in claim 1, further comprising a releasable coupling means for affixing said at least one guide stop to said inner track.

3. The power saw attachment as set forth in claim 2, wherein said releasable coupling means is at least a set screw for engaging the inner track.

4. The power saw attachment as set forth in claim 3, wherein said set screws extend between the at least one guide stop and the inner track and an acute angle relative thereto.

5. The power saw attachment as set forth in claim 1 wherein wall is removably supported on said measuring guide attachment.

6. The power saw attachment according to claim 5, further comprising a slot defined by said measuring guide attachment, said slot configured to receive said wall.

7. The power saw attachment according to claim 6, further comprising a spacer fixed to said measuring guide attachment for spacing the workpiece from said measuring guide attachment.

8. A method for using a power saw attachment for cutting a workpiece comprising the steps of:

forming a U-shaped base having an axial length and the base being defined by a first wall and a second wall extending upwards from a bottom wall along an axial length;

inserting a U-shaped inner track axially and centrally disposed between said first wall and said second wall of said base;

supporting a measuring guide attachment directly on the base spaced from the U-shaped inner track and slidably received between the first and second walls of the base;

supporting a stop wall on said measuring guide attachment extending perpendicular to said axial length bottom wall of said U-shaped base, and adjustably coupling at least one guide stop solely on said inner track and separate from the measuring guide attachment, the at least one guide stop being axially moveable along the length of the U-shaped inner track independent of and relative to the measuring guide attachment; and axially abutting the measuring guide attachment against a face of the at least one guide stop to position the stop wall on the measuring guide attachment parallel with the face of the at least one guide stop, and the measuring guide attachment defines a passage through which the inner track extends and an abutment edge for abutting on the at least one guide stop coupled to the inner track.

* * * * *